United States Patent
Funabashi

(10) Patent No.: US 7,361,378 B1
(45) Date of Patent: Apr. 22, 2008

(54) METHOD FOR MANUFACTURING RADIATION IMAGE CONVERSION PANEL

(75) Inventor: Makoto Funabashi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 09/612,543

(22) Filed: Jul. 7, 2000

(30) Foreign Application Priority Data

Jul. 7, 1999 (JP) .................................. 11-193131

(51) Int. Cl.
*B05D 5/06* (2006.01)

(52) U.S. Cl. ....................................................... 427/65

(58) Field of Classification Search ................. 427/64, 427/65
See application file for complete search history.

(56) References Cited

U.S. PATENT DOCUMENTS

| | | | | |
|---|---|---|---|---|
| 2,819,183 A | * | 1/1958 | Alles | 428/215 |
| 4,028,550 A | * | 6/1977 | Weiss et al. | 250/483.1 |
| 4,208,470 A | * | 6/1980 | Rabatin | 428/328 |
| 4,306,571 A | * | 12/1981 | McLeod, Jr. | 600/595 |
| 4,360,571 A | * | 11/1982 | Rabatin | 428/691 |
| 4,405,454 A | * | 9/1983 | Hultsch et al. | 209/279 |
| 4,501,971 A | * | 2/1985 | Ochiai | 250/483.1 |
| 5,028,509 A | * | 7/1991 | Shimada et al. | 430/139 |
| 5,145,743 A | * | 9/1992 | Beutel et al. | 428/403 |
| 5,360,578 A | * | 11/1994 | Leblans et al. | 252/301.4 H |
| 5,772,916 A | * | 6/1998 | Jamil et al. | 252/301.4 R |
| 5,952,666 A | * | 9/1999 | Nakano et al. | 250/484.4 |
| 6,031,236 A | * | 2/2000 | Arakawa et al. | 250/484.4 |

FOREIGN PATENT DOCUMENTS

| | | |
|---|---|---|
| JP | B2-5423400 | 8/1979 |
| JP | A58200200 | 11/1983 |
| JP | A11106748 | 4/1999 |

* cited by examiner

*Primary Examiner*—Timothy Meeks
*Assistant Examiner*—Jimmy Lin
(74) *Attorney, Agent, or Firm*—Birch, Stewart, Kolasch & Birch, LLP

(57) ABSTRACT

A method for manufacturing a radiation image conversion panel which comprises the steps of: effecting aggregate reduction for a calcined product of a stimulable phosphor by dispersion in a dispersion medium, to thereby obtain a slurry; removing grains therefrom that are of at least a predetermined size by wet classification; thereafter adding a binder, with the dispersion medium being substituted by a solvent when necessary, to thereby prepare a phosphor layer coating material; and subsequently applying the coating material onto a surface of a support and drying.

6 Claims, No Drawings

METHOD FOR MANUFACTURING RADIATION IMAGE CONVERSION PANEL

BACKGROUND OF THE INVENTION

1. Field of the Invention

The present invention relates to a method for manufacturing a radiation image conversion panel of a stimulable phosphor type.

2. Description of the Related Art

A radiation image recording and reproducing method using a stimulable phosphor is known, which can replace conventional radiography. This method utilizes a radiation image conversion panel containing a stimulable phosphor (that is, an accumulative phosphor sheet). In this method, radiation transmitted through a subject or emitted from an object to be examined is absorbed into the stimulable phosphor of the above-mentioned panel, and the stimulable phosphor is excited by an electromagnetic wave (excitation light) such as visible light or infrared light in a time sequential manner so as to allow radiation energy accumulated in the stimulable phosphor to emit as fluorescent emission (stimulable emission). Subsequently, an electric signal is obtained by photoelectrically reading the fluorescence, and based on the obtained electric signal, a radiation image of the subject or object to be examined is reproduced as a visible image. The panel for which the reading has been completed is made ready for subsequent photographing after remaining images have been deleted therefrom. That is, the radiation image conversion panel can be used repeatedly.

The above-described radiation image recording and reproducing method has an advantage in that a radiation image having much information can be obtained using a radiation dosage much smaller than in conventional radiography using a combination of a radiographic film and intensifying screen. Further, a radiographic film is consumed each time an image is produced in conventional radiography. In contrast, a radiation image conversion panel in the radiation image recording and reproducing method is advantageous from the standpoint of resource protection and economic efficiency due to reusability.

The stimulable phosphor is a phosphor which exhibits stimulable emission when excitation light is irradiated thereon after having being irradiated with radiation. For practical use, a phosphor which emits stimulable emission in a wavelength range from 300 to 500 nm by excitation light in a wavelength range from 400 to 900 nm is generally employed. An example of the stimulable phosphor conventionally used in radiation image conversion panels, is a rare earth-activated alkaline earth metal halide based phosphor.

The radiation image conversion panel has a basic structure comprised of a support and a stimulable phosphor layer (hereinafter referred to merely as "phosphor layer") provided on the support surface. However, a support is not necessarily needed if the phosphor layer is self-supporting. The phosphor layer is usually comprised of a stimulable phosphor and a binder which contains and supports the phosphor in a state of dispersion. However, phosphor layers comprised only of an aggregate of stimulable phosphors formed by vapor deposition or sintering and containing no binder are also known. Further, radiation image conversion panels having a phosphor layer in which high polymer materials are impregnated in voids in an aggregate of stimulable phosphors are also known. All of the above-described phosphor layers exhibit the property of stimulable emission when irradiated with excitation light after having absorbed radiation such as X-rays. Accordingly, the radiation transmitted through a subject or emitted from an object to be examined is absorbed in the phosphor layer of the radiation image conversion panel in proportion to the amount of the radiation, and a radiation image of the subject or the object to be examined is formed as an image of accumulated radiation energy in the radiation image conversion panel. The accumulation image can be released as stimulable emission light by irradiation with excitation light, and photoelectrically reading the stimulable emission light and converting the same into an electric signal, so that the radiation energy accumulation image can be made into a visible image.

The above-described rare earth-activated alkaline earth metal halide based stimulable phosphor is excellent in sensitivity, and when this stimulable phosphor is used in a radiation image conversion panel, it produces a radiation reproduction image having high sharpness and is thereby provided as a stimulable phosphor improved for practical usages. However, with the advance of a radiation image recording and reproducing method being put into practical use, there has been increased demand for stimulable phosphors having further improved characteristics.

The phosphor layer is generally formed in such a manner that a phosphor layer coating liquid prepared by adding a stimulable phosphor and a binder to a suitable solvent and then dispersing and dissolving the materials in the solvent to form a phosphor layer coating liquid. Thereafter, the coating liquid is applied and dried on the surface of a support. However, if the phosphor layer coating liquid produces a phosphor layer having coarse grains, graininess deteriorates in the resulting radiation image conversion panel.

In order to remove coarse grains, there is disclosed a method in which an aggregate reduction process is performed by again dispersing a calcined stimulable phosphor in a dispersion medium, resulting in a slurry, which is subjected to wet classification (Japanese Patent Application Laid-Open (JP-A) No. 11-106748). According to this method, coarse grains formed in calcining the stimulable phosphor can be substantially reduced and a radiation image conversion panel having improved graininess can be obtained.

However, the slurry, which has been subjected to wet classification, is dried and grains of the stimulable phosphor thereby form again. Thereafter, the stimulable phosphor is used for preparing the phosphor layer coating liquid. In drying the coating liquid, there is the possibility that the grains will again aggregate into coarse grains to at least some degree.

SUMMARY OF THE INVENTION

The present invention provides a method for manufacturing a radiation image conversion panel having improved graininess characteristics.

A preferred embodiment in accordance with a first aspect of the present invention is a method for manufacturing a radiation image conversion panel, comprising the steps of: (a) dispersing a calcined product of stimulable phosphor in a dispersion medium, to obtain a slurry; (b) eliminating grains that are of at least a predetermined size from the slurry, using wet classification; (c) adding, to the slurry, a binder that is substantially soluble therein, to prepare a coating material; and (d) applying the coating material to a support and drying to thereby form a phosphor layer.

In a preferred embodiment in accordance with a second aspect of the present invention, the step of eliminating grains that are of at least a predetermined size, includes repeating wet classification a plurality of times.

A preferred embodiment in accordance with a third aspect of the present invention is a method for manufacturing a radiation image conversion panel, comprising the steps of: (a) dispersing a calcined product of stimulable phosphor in a dispersion medium, to obtain a slurry; (b) eliminating grains that are of at least a predetermined size from the slurry, using wet classification; and (c) adding a binder to the slurry that is substantially soluble therein, to form a coating material.

According to the first, second, and third aspects of the present invention, the phosphor layer coating liquid is prepared in a state of being dispersed in a solution without drying again the stimulable phosphor dispersed suitably by aggregate reduction processing, and a phosphor layer is formed by applying the phosphor layer coating liquid. As a result, there is no possibility that aggregate of grains caused by drying occurs, and an obtained radiation image conversion panel has an extremely high graininess.

DESCRIPTION OF THE PREFERRED EMBODIMENTS

A method for manufacturing a radiation image conversion panel according to the present invention will be hereinafter described in detail.

[Calcined Product of Stimulable Phosphor]

In the present invention, as a calcined product of the stimulable phosphor, various materials can be selected in accordance with characteristics of a radiation image conversion panel to be obtained.

A preferable calcined product of a stimulable phosphor is represented by the following constitutional formula (I):

$(Ba_{1-a}, M^{II}_a)FX \cdot bM^I \cdot cM^{III} \cdot dA : xLn$     (I)

wherein: $M^{II}$ indicates at least one kind of alkaline earth metal selected from a group consisting of Sr, Ca, and Mg; $M^I$ indicates at least one kind of alkaline earth compound selected from a group consisting of Li, Na, K, Rb, and Cs; $M^{III}$ indicates at least one kind of trivalent metal compound (not including $Al_2O_3$) selected from a group consisting of Al, Ga, In, Tl, Sc, Y, Cd, and Lu; X indicates at least one kind of halogen selected from a group consisting of Cl, Br, and I; Ln indicates at least one kind of rare earth element selected from a group consisting of Ce, Pr, Sm, Eu, Gd, Tb, Dy, Ho, Nd, Er, Tm, and Yb; A indicates at least one kind of metallic oxide selected from a group consisting of $Al_2O_3$, $SiO_2$, and $ZrO_2$; and a, b, c, d, and x are respectively set so as to satisfy relational expressions $0 \leq a \leq 0.3$, $0 \leq b \leq 2$, $0 \leq c \leq 2$, $0 \leq d \leq 0.5$, $0 \leq x \leq 0.2$.

The calcined product of a stimulable phosphor represented by the above-described constitutional formula (I) may be prepared by any conventionally known method, and it can be prepared, for example, by the following processes (a) to (d).

(a) First, halides of europium (Eu) and halides of calcium (Ca) are added to an aqueous solution of $BaBr_2$. Further, when necessary, a compound of alkali metal M (for example, halides, nitrite, nitrate, or acetate) is added. The alkali metal compound is not necessarily added at this time, and may be added when phosphor precursor crystals and oxides are mixed in a process (c), which will be described later. In this case, acid, ammonia, alcohol, water soluble high polymer, or insoluble metal-oxide fine-grained powder may further be added by a small amount as occasion demands. The resulting solution (reaction mother liquor) is maintained at a temperature of 20 to 100° C. A density of $BaBr_2$ in this solution before starting of reaction is preferably 0.9 to 1.6 mol/liter. Next, inorganic fluorides (aqueous solution of ammonium fluoride, or slurry of barium fluoride) are injected into the solution (reaction mother liquor) maintained at a temperature of 20 to 100° C., preferably at a temperature of 40 to 80° C., and particularly at a temperature of 60° C. or thereabouts, at a fixed speed using a pipe with a pump, or the like while stirring the solution. The inorganic fluorides are preferably injected into a region of the solution in which there is strong stirring. Due to the injection of inorganic fluorides into the reaction mother liquor, rare earth-activated barium fluorobromide based phosphor precursor crystals (hereinafter referred to as BFB crystals) precipitate. Subsequently, the BFB crystal is separated from the solvent by filtration or centrifugation and sufficiently washed by methanol or the like, and then dried.

(b) Halides of europium (Eu) are added to an aqueous solution of $BaI_2$. In this case, acid, ammonia, alcohol, water soluble high polymer, or insoluble metal-oxide fine-grained powder may further be added in small amounts as occasion demands. The resulting solution (reaction mother liquor) is maintained at a temperature of 20 to 100° C. A density of $BaI_2$ in this solution before starting of reaction is preferably 2.9 to 4.2 mol/liter. Next, inorganic fluorides (aqueous solution of hydrogen fluoride, or slurry of barium fluoride) are injected into the solution (reaction mother liquor) maintained at a temperature of 20 to 100° C., preferably at a temperature of 40 to 80° C., and particularly at a temperature of 60° C. or thereabouts, at a fixed speed using a pipe with a pump, or the like while stirring the solution. The inorganic fluorides are preferably injected into a region of the solution in which there is strong stirring. Due to the injection of inorganic fluorides into the reaction mother liquor, rare earth-activated barium fluoroiodide based phosphor precursor crystals (hereinafter referred to as BFI crystals) precipitate. Subsequently, the BFI crystals are separated from the solvent by filtration or centrifugation and sufficiently washed by isopropanol or the like, and then dried.

(c) Mixed sufficiently with the above-described BFB crystals and BFI crystals are fine grains of oxide A ($Al_2O_3$, $SiO_2$, or the like), and when necessary, halides of alkali metal A, $BaF_2$ and/or $BaBr_2$ are added while stirring. The oxide A is added for the purpose of preventing change of grain shape caused by sintering of the phosphor precursor crystals during calcinating in a subsequent process (d) or change of grain size distribution caused by fusion between grains. The fine grains of oxide A uniformly adhere to crystal surfaces due to the mixing. The oxide A is preferably $Al_2O_3$, and an amount thereof added is suitably in a range from 0.1 to 1.0% by weight of the total amount of the phosphor precursor crystals.

(d) The above-described mixture is placed in a heat resisting container such as a quartz boat, an alumina pot, or a quartz pot and calcined in the reactor core of an electric furnace. A calcinating temperature is preferably in a range from 700 to 900° C., and more preferable in a range from 750 to 900° C. The calcinating atmosphere comprises a nitrogen gas atmosphere containing a very small amount of gaseous oxygen. The calcinating time varies depending on the amount of the mixture, the calcinating temperature, the temperature at which the mixture is taken out of the furnace, and the like.

Preferably, the calcinating time is from one to ten hours, and more preferably two to six hours.

For example, the mixture is first calcined in the electric furnace at a fixed temperature in a range from 750 to 900° C. for two to six hours. During the calcinating, the interior of the furnace is evacuated at least once, and thereafter, is replaced with a nitrogen gas atmosphere containing a very small amount of gaseous oxygen. Next, the temperature in the furnace is reduced to a temperature of 750° C. or less over of a period of at least 30 minutes. Thereafter, the interior of the furnace is replaced again with a nitrogen gas atmosphere containing a very small amount of gaseous oxygen. Subsequently, the interior of the furnace is cooled to a temperature of 350° C. or less so as to avoid exposure to an outside atmosphere. Thereafter, the calcined product is removed from the furnace and exposed to the surrounding environment.

The ratio of the total weight, m (kg), of the above-described phosphor precursor crystals to a capacity of the interior of the electric furnace, 1 (L), is preferably set such that $m/1 \leq 0.05$ (kg/L).

[Aggregate Reduction Process]

The above-described calcined material of a stimulable phosphor is then subjected to an aggregate reduction (dispersing) process. The aggregate reduction process is conducted by dispersing the calcined product in a suitable dispersion medium. The aggregate reduction process mentioned herein means a process in which the above-described calcined product is dispersed in a dispersion medium and stirred so as to allow relaxation of sintering and aggregation caused by calcinating.

Examples of the dispersion medium used herein include water; various alcohols such as methanol, ethanol, propanol, and butanol; ketones such as acetone and methyl ethyl ketone; ethers such as dioxane, ethyleneglycol monoethyl ether, and ethyleneglycol monomethyl ether; an aqueous solution containing metal ion such as $Li^+$, $Na^+$, $K^+$, $Rb^+$, $Cs^+$, or $Ba^{2+}$; and mixtures thereof.

Among these dispersion mediums, a dispersion medium which imparts desired characteristics to the resulting radiation image conversion panel may be suitably selected. For example, to obtain a high dispersibility, lower alcohol may optionally be selected. In another example, where barium is contained in a composition of a calcined product of stimulable phosphor, an aqueous solution containing at least one kind of metal ion which has ionization energy smaller than or equal to that of barium, that is, metal ion such as $Li^+$, $Na^+$, $K^+$, $Rb^+$, $Cs^+$, or $Ba^{2+}$, may optionally be selected so as to prevent dissolution of barium.

In a case in which the aqueous solution containing at least one kind of metal ion such as $Li^+$, $Na^+$, $K^+$, $Rb^+$, $Cs^+$, or $Ba^{2+}$ is selected, the metal ion of the aqueous solution is generally added to water in a metallic salt sate, and is therefore made to exist together with a negative ion. The negative ion type is not particularly limited. Particularly, halides are preferably used as the metallic salt and preferable examples of halides include Cl, Br, and I from the standpoint of stability of the liquid. The aqueous solution containing the metal ion may be, for example, prepared using a part of the above-described calcined product.

The metal ion in the aqueous solution containing metal ion preferably has a density such that barium in the calcined product of the stimulable phosphor is difficult to dissolved in the solution. The density of the metal ion varies depending on the kind of metal ion, temperature, and the kind of negative ion. Hence, an absolute value thereof cannot be uniformly regulated. However, in practice, the density of the metal ion is controlled by saturation density of the metallic salt at the temperature in the aggregate reduction process in a state where a metallic salt is added to water. The density of the metallic salt is preferably greater than 0 and less than or equal to the saturation density at the liquid temperature in this process, more preferably greater than or equal to $1/10$ of the saturation density at the liquid temperature in this process, and still more preferably greater than or equal to $3/10$ of the saturation density. In a case in which the upper limit of the density is $10/10$ or less, no difficulty arises. The upper limit is preferably $9/10$ or less, more preferably $8/10$ or less from the standpoint of stability of the solution.

So long as one of the above-described dispersion mediums in which a binder can be dissolved, is used for a phosphor layer coating liquid (which will be described later), the dispersion medium acts as a solvent for the phosphor layer coating liquid in its original state. Hence a solvent substitution process, which will be described later, can be omitted. The dispersion medium in which "the binder can be dissolved" or in which "the binder is soluble" as used herein is not necessarily a liquid in which the binder can completely be dissolved, and is provided based on a concept including a liquid having a solubility sufficient for preparing the phosphor layer coating liquid which can be applied for forming a phosphor layer.

The dispersion medium in which the binder can be dissolved depends on the kind of binder, but generally, an organic solvent is used. Particularly, various alcohols such as methanol, ethanol, propanol, and butanol; ketones such as acetone and methyl ethyl ketone; aromatic solvents such as toluene and xylene; esters such as methyl acetate, ethyl acetate, and butyl acetate; ethers such as dioxane, ethyleneglycol monoethyl ether and ethyleneglycol monomethyl ether; and mixtures thereof are preferably used.

The amount of a stimulable phosphor with respect to that of the dispersion medium in the aggregate reduction processing is preferably in a range from 10 to 300 parts by weight in 100 parts by weight of the dispersion medium.

Stirring in the aggregate reduction process is not particularly limited. Turbulent stirring using a mixing blade is preferable from the standpoint of efficient aggregate reduction processing. As other methods of stirring, a grinding machine such as a roll mill or a vibrating mill, or a mixing machine such as a double cone can also be used.

The stirring may be effected to such a degree that sintering and aggregation caused by calcinating can be alleviated, and the degree of stirring may suitably be set in accordance with the kind of stirring device, a state of the calcined composition, and the like. However, if the stirring is too weak, sintering and aggregation is not alleviated and a yield at the time of classification decreases. Further, if the stirring is too strong, phosphor grains obtained after calcinating are crushed due to stress and stimulable emission deteriorates. For this reason, in consideration of both cases, the degree of stirring is preferable set in a suitable range.

Stirring time may be set such that a degree that sintering and aggregation caused by calcinating are alleviated, and may suitably be set in accordance with the kind of stirring device, a state of the calcined composition, and the above-described degree of stirring. Specifically, the stirring time is preferably 30 minutes or more, and more preferably one hour or more. If it is shorter than 30 minutes, sintering and coagulation are not alleviated and a yield at the time of classification decreases. On the other hand, if the stirring time is too long, stimulable emission deteriorates by repeated dissolution of barium into the aqueous solution and re-deposition. Accordingly, the stirring time is preferably 48 hours or less, more preferably 24 hours or less.

[Wet Classification Process]

A slurry obtained by the aggregate reduction process is thereafter subjected to a wet classification process in which grains of a fixed grain size or larger in the slurry are removed.

In the wet classification, ordinary filtration or a vibrating screen is used. Conditions of wet classification are not particularly limited so long as so-called coarse grains are sufficiently removed.

The wet classification operation is preferably carried out a plurality of times so as to prevent deterioration of classification efficiency caused by clogging of a mesh. Namely, it is preferable that the classification process be carried out in a plurality of steps in which meshes are sequentially used from a larger-diameter size to a smaller-diameter size (a filtration process is provided so that mesh sizes sequentially decrease), wherein a target classification is finally obtained after the final mesh.

The final mesh size is preferably 50 μm or less, more preferably 30 μm or less. The "final mesh size" mentioned herein means a mesh size used in a single operation of wet classification, or means a mesh size used in the final operation when the wet classification operation is effected a plurality of times.

Filtration in the wet classification is preferably pressure filtration so as to prevent deterioration of classification efficiency caused by mesh clogging.

[Solvent Substitution Process]

When a dispersion medium in which a binder used for the phosphor layer coating liquid (which will be described later) is not substantially soluble in the dispersion medium, the slurry obtained in the wet classification process, from which grains having a fixed grain size or larger are removed, is subjected to a solvent substitution process. When the dispersion medium in which a binder used for the phosphor layer coating liquid (described later) is soluble in the dispersion medium, the above-described slurry may be optionally still passed to the solvent substitution process so as to improve suitability for coating.

The solvent substitution process is a process in which the dispersion medium in the slurry from which grains having a fixed grain size or larger have been removed, is substituted for a solvent in which the binder is substantially soluble. Using so-called decantation in which the slurry is kept standing still for a fixed time and a supernatant liquid removed, filtration, or centrifugal filtration, after the slurry has been concentrated, the solvent in which the binder can be dissolved is added and substituted. Decantation is preferably used to reduce the risk that grains of stimulable phosphor in the slurry will aggregate again.

Examples of solvent that can be substituted for the dispersion medium include aromatic solvents such as toluene and xylene; ketones such as methyl ethyl ketone and methyl isobutyl ketone; esters such as methyl acetate, ethyl acetate, and butyl acetate; ethers such as dioxane, ethyleneglycol monoethyl ether and ethyleneglycol monomethyl ether; and mixtures thereof.

In substituting the above-described dispersion medium with the solvent by the decantation, the time in which the slurry stands still is preferably until a layer comprised of substantially only the dispersion medium (supernatant layer) and a layer in a mixed state are clearly separated to a certain extent. The time in which the slurry stands still also depends on the kind and density of dispersion medium used, solvent, and stimulable phosphor, and is preferably in a range from 3 minutes to 24 hours, more preferably 3 to 360 minutes.

The process of substituting the above-described dispersion medium with the solvent is preferably carried out several times so as to achieve a greater substitution efficiency. Particularly, in the case of decantation, the substitution efficiency is not high in a single operation, and therefore, three or more operations are preferably carried out.

In substituting the above-described dispersion medium with the solvent, when the dispersion medium is poorly compatible with a solvent which is an alternative thereto, preferably, the dispersion medium is temporarily substituted by a solution which is satisfactorily compatible with both the dispersion medium and the solvent, and thereafter, the solution is substituted with the solvent. For example, in a case in which the dispersion medium is a water based medium and a solvent which is an alternative to the dispersion medium is an organic solvent, preferably, the water based medium is temporarily substituted with alcohol such as methanol, and thereafter, the alcohol is substituted with the organic solvent. In this case, the number of times of substitution is set in such a manner as described above.

In the solvent substitution process, preferably, the slurry is condensed by limiting the added solvent to an amount less than the amount of dispersion medium discharged, and the density of stimulable phosphor in the slurry is adjusted to achieve a suitable quality for a phosphor layer coating liquid. In a case in which the density of the stimulable phosphor in the slurry in a state of being dispersed in the dispersion medium is set so as to be optimal for the aggregate reduction process, the density becomes considerably lower than the density suitable for a phosphor layer coating liquid, and therefore, it is necessary to adjust the above-described density of the stimulable phosphor.

The amount of stimulable phosphor in the concentrated slurry depends on desired characteristics for the radiation image conversion panel, and the kind of dispersion medium, solvent, and stimulable phosphor used. The amount of stimulable phosphor is preferably in a range from 30 to 90% by weight based on the total weight of the slurry, more preferably in a range from 50 to 90% by weight.

[Phosphor Density Adjusting Process]

If a solvent substituting process is not conducted, a separate phosphor density adjusting process is preferably provided after the wet classification process, and prior to the coating liquid preparing process. As discussed in the above-described solvent substitution process, when the density of stimulable phosphor in the slurry is set so as to be optimal for the aggregate reduction process, generally, the density is considerably lower than that suitable for a phosphor layer coating liquid. Therefore, the phosphor density adjusting process is preferably performed.

The phosphor density adjusting process is that in which the slurry from which grains having a fixed grain size or greater have been removed, is concentrated and the density of stimulable phosphor in the slurry is adjusted. This process is preferably performed using a so-called decantation method in which the slurry is kept standing still for a fixed period of time and a supernatant liquid is discharged, filtration, or a centrifugal filtration method. Among these methods, the decantation method is preferable for the reason that grains of stimulable phosphor in the slurry do not aggregate again in most cases.

When the phosphor density adjusting process is carried out using the decantation method, the time in which the slurry is kept standing still is preferably until a layer comprised only of a dispersion medium (supernatant layer) and a layer in a mixed state are separated clearly to a certain extent, and the amount of stimulable phosphor contained in the layer in a mixed state (that is, in the concentrated slurry) is at a desired density. The time depends on the desired density, the kind of dispersion medium, solvent, and stimulable phosphor used, and the like, and is preferably in a range from 3 minutes to 24 hours, more preferably in a range from 3 to 360 minutes.

The amount of stimulable phosphor in the concentrated slurry depends on desired characteristics of the radiation image conversion panel, and the kind of dispersion medium, solvent, and stimulable phosphor used. The amount of stimulable phosphor contained is preferably in a range from 30 to 90% by weight based on the total weight of the slurry, more preferably in a range from 50 to 90% by weight.

[Coating Liquid Preparing Process]

The slurry obtained in the wet classification process, or subjected to the solvent substitution process, or the phosphor density adjusting process (which slurry will hereinafter be referred to as "coating liquid preparing slurry") is thereafter subjected to a coating liquid adjusting process, and a phosphor layer coating liquid is prepared. The coating liquid adjusting process mentioned herein is that in which at least a binder is added to the coating liquid preparing slurry so as to prepare a phosphor layer coating liquid. Further, other stimulable phosphor and/or additives such as a coloring agent may added to the phosphor layer coating liquid.

The type of binders that can be used are not particularly limited. Examples thereof include: natural high molecular substances, for example, proteins such as gelatin, polysaccharides such as dextran, and gum arabic, synthetic high molecular substances such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol, linear polyester, or epoxy resin, and mixtures thereof. Among these examples of the binder, nitrocellulose, liner polyester, polyalkyl (meth) acrylate, polyurethane, a mixture of nitrocellulose and liner polyester, and a mixture of nitrocellulose and polyalkyl (meth)acrylate are particularly preferable.

A mixing ratio (percentage by weight) of the binder in the phosphor layer coating liquid and the stimulable phosphor depends on the characteristics desired for a radiation image conversion panel, the kind of stimulable phosphor, and the like. The mixing ratio is preferably in a range from 1:1 to 1:100, and more preferably in a range from 1:8 to 1:40.

Various additives such as a dispersing agent for improving dispersibility of the phosphor in the coating liquid, and a plasticizer for improving bonding force between the phosphor and the binder in a resulting phosphor layer may be mixed with the phosphor layer coating liquid. Examples of the dispersing agent used for the above-described purpose include phthalic acid, stearic acid, caproic acid, and lipophilic surface active agent. Further, examples of plasticizer include phosphates such as triphenyl phosphate, tricresyl phosphate, and diphenyl phosphate, phthalates such as diethyl phthalate and dimethoxyethyl phthalate, glycolates such as ethyl phthalyl ethyl glycolate and butyl phthalyl butyl glycolate, and polyesters of polyethylene glycol and aliphatic dibasic acid, for example, polyester of triethylene glycol and adipic acid, or polyester of diethylene glycol and succinic acid.

[Phosphor Layer Forming Process]

The phosphor layer coating liquid prepared in the coating liquid preparing process is thereafter subjected to a phosphor layer forming process in which a phosphor layer is formed by applying and drying the coating liquid on a support surface.

The coating operation is desirably carried out uniformly, and can be done using ordinary coating methods, for example, using a doctor blade, a roll coater, or a knife coater.

The support used in the present invention may be selected from those which are conventionally known as materials used for a support in a radiation image conversion panel. In a generally known radiation image conversion panel, in order to strengthen bonding of the support and the phosphor layer, or to improve sensitivity or image quality (sharpness and graininess) of the radiation image conversion panel, the support includes, on the surface thereof where the phosphor layer is provided, an adhesiveness imparting layer formed by applying a polymer such as gelatin, a light reflection layer comprised of light reflecting substances such as titanium dioxide, a light absorbing layer comprised of light absorbing substances such as carbon black, and the like. The support used in the present invention may also include these various layers as described above. The configuration of these layers can be selected in accordance with the purpose and application of the desired radiation image conversion panel to be formed. Further, as disclosed in JP-A No. 58-200200, the support may be formed in such a manner that micro irregularities are made on the surface thereof at a surface facing the phosphor layer (in a case in which the adhesiveness imparting layer, reflective light layer, or light absorbing layer is provided on the surface of the support facing the phosphor layer, which surface means the surface of any of these three layers), so as to improve the image sharpness in the radiation image conversion panel.

A coating film is formed on the support as described above, and thereafter dried so as to form a phosphor layer. The preferable thickness of the phosphor layer varies according to the desired characteristics of the radiation image conversion panel to be obtained, the kind of stimulable phosphor, the mixing ratio of the binder and the stimulable phosphor, and the like. Normally, the thickness of the layer is 20 µm to 1 mm, and more preferably from 50 to 500 µm. The phosphor layer need not necessarily be formed by directly applying the coating liquid onto the support in such a manner as described above. For example, a phosphor sheet which becomes a phosphor layer by applying a coating liquid to a temporary support and drying the same may be formed and then peeled away from the support, and is pressed on the support. Alternatively, the support and the phosphor layer may be bonded together, for example, using an adhesive agent (a description that "the phosphor layer is formed by applying and drying a phosphor layer coating liquid on the surface of the support" given in the present invention is defined as a concept having the above-mentioned case).

Next, a description will be given in detail of a case in which the phosphor sheet is temporarily formed on the temporary support, and thereafter, transferred to the support.

The phosphor layer coating liquid prepared as described above is uniformly applied to the surface of a phosphor sheet-forming temporary support and a coating film of the coating liquid is thereby formed. The coating operation can be carried out using any ordinary coating method, for example, using a doctor blade, a roll coater, or a knife coater.

Materials for the temporary support can be selected from a nonexclusive group, for example, consisting of glass, a metallic plate, various materials used as supports of an intensifying screen in conventional radiography, and materials generally known as suitable support material for radiation image conversion panels. Examples of such materials include plastic film such as cellulose acetate, polyester, polyethylene terephthalate, polyamide, polyimide, triacetate, or polycarbonate; a metal sheet such as aluminium foil or aluminium alloy foil; paper such as plain paper, baryta paper, resin treated paper, pigment paper containing a pigment such as titanium dioxide, or paper formed by sizing polyvinylalcohol or the like; a plate or sheet of ceramics such as alumina, zirconia, magnesia, and titania; and the like.

The phosphor layer coating liquid is applied to the temporary support and dried, and thereafter, peeled from the temporary support and formed as a phosphor sheet made into a phosphor layer of the radiation image conversion panel. Accordingly, preferably, a mold releasing agent is applied in advance to the surface of the temporary support so as to facilitate peeling of the formed phosphor sheet from the temporary support.

Next, a support of the radiation image conversion panel is prepared separately from the phosphor sheet formed as described above. This support is as described above.

In a generally known radiation image conversion panel, in order to strengthen bonding of the support and the phosphor layer or to improve sensitivity or image quality (sharpness and graininess) of the radiation image conversion panel, the support includes, on the surface thereof at a side where the phosphor layer is provided, an adhesiveness imparting layer formed by applying a polymer such as gelatin thereto, a light reflection layer comprised of light reflecting substances such as titanium dioxide and gadolinium oxide, a light absorbing layer comprised of light absorbing substances such as carbon black, and the like. The support used in the present invention can also include various layers as described above. The configuration of these layers is preferably selected in accordance with the desired purpose and application of the radiation image conversion panel.

Further, as disclosed in JP-A No. 58-200200, the support may be formed in such a manner that micro irregularities are made on the surface thereof at a side which faces the phosphor layer (in a case in which the adhesiveness imparting layer, reflective light layer, or light absorbing layer is provided on the surface at the side which faces the phosphor layer on the support, which surface means the surface of any of these three layers), so as to improve the image sharpness in the radiation image conversion panel.

The phosphor sheet thus obtained is placed on the surface of the support and bonded thereto under pressure (thermal compression bonding) preferably at a temperature higher than or equal to the softening temperature or melting point of the binder.

As a compression device used for the compression processing, generally known devices such as a calender roll and hot press can be used. For example, the compression processing using the calender roll is performed by placing the above-described phosphor sheet on the support and passing the phosphor sheet between rollers heated to a temperature higher than or equal to the softening temperature or melting point of the binder at a substantially constant speed. However, the compression device used in the present invention is not limited to the above-described ones, and any device may also be used so long as the above-described phosphor sheet can be compressed while being heated.

Pressure during the compression processing is preferably 50 kgw/cm$^2$ or more, and more preferably 200 to 700 kgw/cm$^2$. Heating temperature (in a case of the compression processing using a calender roll, each temperature of the upper and lower rolls) is, as described above, generally set to be a temperature higher than or equal to the softening temperature or melting point of the binder, preferably a temperature which is 10 to 50° C. higher than the softening temperature or melting point. Generally, upper and lower pressurizing members (in a case of the compression processing using a calender roll, upper and lower rolls) are preferably set at the same temperature. Feed speed in the compression processing using a calender roll is preferably in a range from 0.1 to 5.0 m/minute.

The basic structure of the radiation image conversion panel is completed with the phosphor layer being thus formed on the surface of the support, but usually, a protective film is further provided on the phosphor layer. The protective film is formed by applying, onto the phosphor layer, a solution prepared by dissolving substantially transparent organic high molecular substances such as cellulose derivatives or polymethyl methacrylate in a suitable solvent, or by providing, on the surface of a phosphor layer, an organic high polymeric film such as polyethylene terephthalate or a protective film-forming sheet such as a transparent glass plate by means of a suitable additive agent. Alternatively, the protective film is formed by providing a film on the phosphor layer by deposition of an inorganic compound, or the like. Further, a protective film may also be used in which a coating film comprised of a fluorine based resin soluble in an organic solvent is prepared such that perfluoroolefin resin powder or silicone resin powder are dispersed and contained therein.

In order to improve image sharpness, at least one of the above-described various layers which form the radiation image conversion panel may be colored and comprise a coloring agent which absorbs excitation light and which does not absorb stimulable emitted light, and a colored intermediate layer may also be provided separately (see Japanese Patent Application Publication (JP-B) No. 54-23400).

The radiation image conversion panel can be manufactured by the manufacturing method according to the present invention as described above.

EXAMPLES

Example 1

1. Manufacturing of Calcined Product

[Composition of Raw Materials]

| | |
|---|---|
| BaFBr: Eu (Eu density 5.0 × 10$^{-3}$ mole ratio, average grain diameter 6.5 μm) | 12480 g |
| BaFI: Eu (Eu density 5.0 × 10$^{-3}$ mole ratio, average grain diameter 7.1 μm) | 2640 g |
| BaF$_2$ | 248 g |
| ALUMINA-C (alumina particles manufactured by Nihon Aerosil Co.) | 76 g |

The above-described raw materials of 15444 g were mixed sufficiently.

The above-described mixture was divided into four equal parts and filled in a calcinating vessel (a boat made of quartz glass and having three dimensions of 30 cm (length), 15 cm (width), and 5 mm (glass thickness)). These divided parts were placed in a calcinating space of an electric furnace (a tube furnace having a calcinating space of 100 liters) which is set such that a temperature of furnace atmosphere thereof is 850° C., and heated for two hours (at this time, the calcinating space is made into nitrogen gas atmosphere). Subsequently, the calcinating space was changed to a weakly oxidized atmosphere having 1.3% of oxygen, and further heated for one hour. The calcined product was transferred to a cooling space, in which it is cooled up to 200° C. in a state of being not exposed to the air, and thereafter, taken out into the air.

2. Aggregate Reduction Process 15 kg of the above-described calcined product was placed in 20 liters of methyl ethyl ketone (MEK) stored in a mixing vessel of 50 liters, and stirred for 15 hours while rotating a mixing blade at a speed of 50 rpm using a propeller stirring device in the aggregate reduction processing, thereby obtaining a slurry.

3. Wet Classification Process

The slurry obtained in the aggregate reduction process was subjected to wet classification using a vibrating screen equipped with a nylon mesh of 20 μm size.

4. Phosphor Density Adjusting Process

The slurry having been subjected to the wet classification was placed in a cylindrical vessel whose diameter was 30 cm and height is 250 cm and kept standing still for 30 minutes and 15.9 liters of supernatant liquid was discharged (by decantation), thereby making the density of the stimulable phosphor in the slurry into 80% by weight. This density was set as a theoretical density obtained by subtracting the weight k (kg) of a stimulable phosphor left by classification in the wet classification process from the total weight (15 kg) of the calcined product used in the aggregate reduction process. Concretely, this density is obtained by a calculational expression described below. In this expression, V indicates a weight (kg) of a concentrated dispersion medium (MEK made into a solvent in a later process).

Density of phosphor(% by weight)=$(15-k)/[(15-k)+V]\times 100$

5. Coating Liquid Preparing Process 30.0 g of polyurethane (manufactured by Dainippon Ink & Chemicals, Inc.; trade name: PANDEX T5265H), 7.8 g of epoxy resin (manufactured by Yuka Shell Epoxy Co., Ltd.; trade name: EP1001 [solid]), and 2.3 g of polyisocyanate (manufactured by Nihon Polyurethane Co., Ltd.; trade name: COLONATE HX) were added to 1 kg of a concentrated slurry obtained in the above-described phosphor density adjusting process, and dispersed by a propeller mixer, to thereby prepare a phosphor layer coating liquid having a viscosity of 40 ps.

6. Phosphor Layer Forming Process (a) Preparation of Phosphor Sheet

The phosphor layer coating liquid thus obtained was applied to polyethylene terephthalate (temporary support, thickness: 180 μm) on which a silicon based mold releasing agent was applied, and dried. Thereafter, the dried product was peeled from the temporary support and a phosphor sheet (thickness: 320 μm) was prepared.

(b) Formation of Reflective (Undercoat) Layer

Composition of Reflective Layer:

| | |
|---|---|
| Fine grains of gadolinium oxide ($Gd_2O_3$) (the grain size of grains which amountto 90% by weight of all grains is in a range from 1 to 5 μm) | 30 parts |
| Binder: soft acrylic resin (CRYSCOAT P-1018GS: 20% solution; manufactured by Dainippon Ink & Chemicals, Inc. | 30 parts |
| Phthalic acid ester | 3.5 parts |
| Conductive material: whisker made of zinc oxide | 10 parts |
| Coloring agent: ultramarine blue | 0.4 parts |

An optimum amount of MEK was added to the material of the above-described composition, and then dispersed and mixed by using a dissolver. As a result, a reflective (undercoat) layer-forming coating liquid having a viscosity of 10 Ps (20° C.) was prepared. Polyethylene terephthalate (support) having a thickness of 300 μm was horizontally placed on a glass plate and the above-described undercoat layer-forming coating liquid was uniformly applied onto the surface of the support by using a doctor blade, and thereafter, a coating film was dried and a reflective layer (thickness: 20 μm) was formed on the support surface.

(c) Formation of Phosphor Layer

The previously prepared phosphor sheet was placed on the reflective layer formed on the support, and then subjected to thermal compression bonding. The thermal compression bonding was continuously carried out using a calender roll under a pressure of 500 Kgw/$cm^2$, the temperature of an upper roll was 90° C., and the temperature of a lower roller was 75° C., and feed rate was 1.0 m/minute. Due to the thermal compression bonding, the reflective layer formed on the support and the phosphor sheets were completely bonded by fusion to each other, and a phosphor layer was thereby formed. The thickness of the phosphor layer after having been bonded by fusion was 220 μm.

7. Formation of Protective Film

Composition of Protective Film:

| | |
|---|---|
| Fluorine based resin: copolymer of fluoroolefine and vinylether (LUMIFRON LF-504X (40% solution), manufactured by Asahi Glass Co., Ltd.) | 50 parts |
| Cross linking agent: polyisocyanate (OLESTAR NP38-70S (70% solution), manufactured by Mitsui Toatsu Chemicals, Inc.) | 9 parts |
| Lubricant: alcohol-denatured silicone (X-22-2809 (66% solution), manufactured by Shin-Etsu Chemical Co., Ltd.) | 0.5 parts |
| Catalyst: dibutyltindilaurate (KS1260, manufactured by Kyodo Chemical Co., Ltd.) | 3 parts |

The material having the above-described composition was dissolved in an optimum amount of methyl ethyl ketone/cyclohexane (2/8, volume ratio) and a protective layer-forming coating liquid having a viscosity of 0.3 ps was prepared. The protective layer-forming coating liquid was applied to the above-described phosphor layer using a doctor blade, and thereafter, subjected to heat treatment for 30 minutes at 120° C. so as to be thermally hardened, and then dried. As a result, a protective film having a thickness of 3 µm was formed.

The radiation image conversion panel of Example 1 was manufactured in such a manner as described above, which is comprised of the support, the undercoat layer, the phosphor layer, and the protective film.

Example 2

A radiation image conversion panel of Example 2 was manufactured as in Example 1 except that the dispersion medium used in the loosening process (3.) was changed from methyl ethyl ketone (MEK) to an aqueous solution of $BaBr_2$, which will be obtained in such a manner as described below, and the phosphor density adjusting process (4.) is changed to a solvent substituting process, which will be described below.

Preparation of $BaBr_2$ Aqueous Solution:

$BaBr_2$ was placed in pure water at the rate of 1200 g for 1000 ml of pure water and stirred by a magnetic stirrer at room temperature for one hour. Insoluble components were removed by filter paper and 20 liters of saturated aqueous solution of $BaBr_2$ (density of Ba is 0.32 mol/liter) was prepared as an aqueous solution containing metal ion.

Solvent Substituting Process:

A series of operations in which the slurry having been subjected to wet classification was kept standing still for 30 minutes and 18 liters of supernatant liquid discharged (by decantation), and the same amount of methanol as that discharged added thereto was repeated ten times, and water serving as a dispersion medium was temporarily substituted with methanol.

Further, a series of operations in which the slurry substituted with methanol was kept standing still for 30 minutes and 17 liters of supernatant liquid discharged (by decantation), and the same amount of MEK as that discharged added thereto, was repeated three times, and methanol was temporarily substituted with MEK serving as a solvent. In this case, by adjusting the amount of MEK added in the final decantation, the density of stimulable phosphor in the slurry was resulted in 80% by weight. The density of stimulable phosphor in the slurry was calculated in the same way as in Example 1.

Comparative Example 1

A radiation image conversion panel of comparative example 1 was manufactured as in Example 1 except that the phosphor density adjusting process (4.) and the coating liquid preparing process (5.) were changed to a solid-liquid separating process (4-A.), a drying/dry classification process (4-B.), and a coating liquid preparing process (5-A.), which will be described below.

4-A. Solid-Liquid Separating Process

The slurry having been subjected to the wet classification process was filtered by pressure filtration (pressurization with compressed air of 2.0 kgf/cm²) and a solid liquid was separated. In this case, washing with methanol, in which after filtration of the slurry, 500 ml of methanol was added thereto, and filtered again, was conducted twice.

4-B. Dry/Dry Classification Process

The obtained product was dried by a drier set at 110° C. for 10 hours, and thereafter, subjected again to dry classification by a vibrating screen (nylon mesh: # 460). As a result, europium-activated barium fluorobromide based phosphor grains were obtained.

5-A. Coating Liquid Preparing Process 200 g of methyl ethyl ketone (MEK) was added to 800 g of the europium-activated barium fluorobromide based phosphor grains thus obtained, 30.0 g of polyurethane (manufactured by Dainippon Ink & Chemicals, Inc.; trade name: PANDEX T-5265H), 7.8 g of epoxy resin (manufactured by Yuka Shell Epoxy Co., Ltd.; trade name: EP1001 [solid]), and 2.3 g of polyisocyanate (manufactured by Nihon Polyurethane Co., Ltd.; trade name: COLONATE HX), and dispersed by a propeller mixer, to thereby prepare a phosphor layer coating liquid having a viscosity of 40 ps.

Test for Evaluation

The image quality of images obtained from the radiation image conversion panels manufactured as described above was evaluated as follows. Each of the radiation image conversion panels thus prepared were irradiated with X-rays having a tube voltage of 80 KVp, followed by scanning with He—Ne Laser light (having a wavelength of 632.8 nm) to thereby excite the phosphor. Light of stimulable emission from the phosphor layer was received and converted into an electric signal, and the electric signal was reproduced, as an image, by an image reproducing device and an image was obtained on a display device. The sharpness of each image was measured from a modulation transfer function (MTF) (spatial frequency: two cycles/mm) and a graininess (RMS) in dosage of 0.1 mR was measured. The results are shown in Table 1.

TABLE 1

|  | Graininess ($\times 10^{-3}$) | Sharpness (%) |
|---|---|---|
| Example 1 | 3.2 | 36 |
| Example 2 | 3.4 | 36 |
| Comparative Example 1 | 4.0 | 36 |

As can be seen from the results of Table 1, no difference in the sharpness is made between examples and comparative example and the graininess in examples is about 20% higher than that in the comparative example. Accordingly, it can be seen that the image quality is improved in the present invention.

As described above, the present invention can provide a method for manufacturing a radiation image conversion panel having an extremely good graininess, or simply a phosphor layer coating material for a radiation image conversion panel.

What is claimed is:

1. A method for manufacturing a radiation image conversion panel, comprising the steps of:
    a) dispersing a calcined product of stimulable phosphor in a dispersion medium, to obtain a slurry;
    b) eliminating grains that are of at least a predetermined size from the slurry of step a), using wet classification;
    c) substituting the dispersion medium with a solvent capable of substantially dissolving the binder, while maintaining a slurry in steps (a)-(c);
    d) adding to the slurry of step c), a binder that is substantially soluble therein, to prepare a coating material; and
    e) applying the coating material to a support and drying to thereby form a phosphor layer.

2. A method for manufacturing a radiation image conversion panel according to claim 1, wherein the step of substituting the dispersion medium includes concentrating the slurry to adjust density of a stimulable phosphor in the slurry.

3. A method for manufacturing a radiation image conversion panel according to claim 1, wherein the step of eliminating grains that are of at least a predetermined size, includes repeating wet classification a plurality of times.

4. A method for manufacturing a radiation image conversion panel according to claim 1, wherein the step of eliminating grains that are of at least a predetermined size, includes using a final mesh size in the wet classification of no more than 50 μm.

5. A method for manufacturing a radiation image conversion panel according to claim 1, wherein the step of dispersing includes providing a calcined product of a stimulable phosphor that is a rare earth-activated alkaline earth metal fluoro-halide based phosphor, represented by a constitutional formula (I) as follows:

$$(Ba_{1-a}, M^{II}_a)FX \cdot bM^{I} \cdot cM^{III} \cdot dA : xLn \qquad (I)$$

wherein, $M^{II}$ indicates at least one kind of alkaline earth metal selected from the group consisting of Sr, Ca, and Mg; $M^{I}$ indicates at least one kind of alkali metal selected from the group consisting of Li, Na, K, Rb, and Cs; $M^{III}$ indicates at least one kind of trivalent metal selected from the group consisting of Al, Ga, In, Ti, Sc, Y, Cd, and Lu, wherein compounds that contain $M^{III}$ exclude $Al_2O_3$; X indicates at least one kind of halogen selected from the group consisting of Cl, Br, and I; Ln indicates at least one kind of rare earth element selected from the group consisting of Ce, Pr, Sm, Eu, Gd, Tb, Dy, Ho, Nd, Er, Tm, and Yb; A indicates at least one kind of metallic oxide selected from the group consisting of $Al_2O_3$, $SiO_2$, and $ZrO_2$; and a, b, c, d and x are respectively set so as to satisfy relational expressions $0 \leq a \leq 0.3$, $0 \leq b \leq 2$, $0 \leq c \leq 2$, $0 \leq d \leq 0.5$, and $0 \leq x \leq 0.2$.

6. A method for manufacturing a radiation image conversion panel according to claim 2, wherein concentrating the slurry includes using decantation.

* * * * *